G. BUTLER.

CAR COUPLING.

No. 9,880. Reissued Sept. 20, 1881.

Attest.
E. R. Hill.
J. Wm. Stehli.

Inventor
George Butler per
Wm. Hubbell Fisher,
Atty.

UNITED STATES PATENT OFFICE.

GEORGE BUTLER, OF CINCINNATI, OHIO.

CAR-COUPLING.

SPECIFICATION forming part of Reissued Letters Patent No. 9,880, dated September 20, 1881.

Original No. 213,974, dated April 8, 1879. Application for reissue filed May 17, 1881.

*To all whom it may concern:*

Be it known that I, GEORGE BUTLER, of the city of Cincinnati, in the county of Hamilton and State of Ohio, have invented a new and useful Improvement in Car-Couplings, of which the following is a specification.

My invention relates to improvements in those coupling devices as a part of which a spring is employed to diminish the shock caused by two cars being quickly brought together, and also to diminish the sudden strain to which the coupling devices between adjacent cars are subjected when a train is quickly started, the spring interposing a gradual resistance to the before-mentioned sudden pressure or strain.

My improvements, in general, consist in such a novel construction and arrangement of the spring, draw-bar, and necessary accompanying devices that the spring shall interpose a gradual resistance to the extent of its full resilient power and before it has been subjected to injurious compression, and in the more common case—viz., in a violent collision—that the rear or back end of the draw-head shall impinge or abut against a front abutment provided to receive the shock, and, in the event of a violent pull on the draw-bar, that a suitable projection on the rear extension—*i. e.*, tail-rod—of the draw-bar shall operate in connection with a rear abutment to receive the shock, these abutments in either case thus respectively preventing further compression of the spring and fully protecting it from injury.

Figure 1:
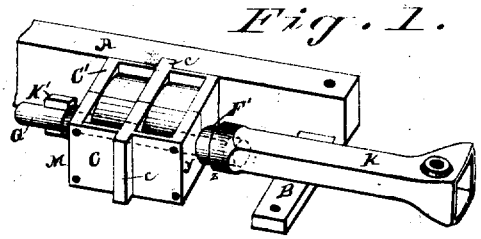
Figure 2:
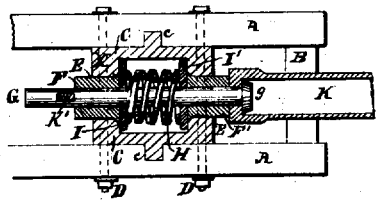
Figure 3:
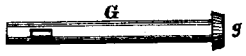
Figure 4:
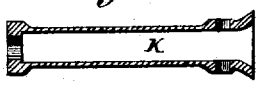

In the accompanying drawings, Figure 1 is a perspective view of a draw-bar and accompanying devices embodying my invention. Fig. 2 is a horizontal section of the same, a portion of the head being omitted. Fig. 3 is a side view of the tail-bar, and Fig. 4 is a longitudinal section of draw-head.

A metallic case or cylinder, M, composed of two members, C C′, is provided, and is here shown having a rectangular exterior and cylindrical internal conformation. This case is suitably secured to the car. In the present instance it is placed between the usual draft timbers or sills, A A, the case being made of a desired size and broad enough, or the draft-timbers brought near enough together, to admit of the case being fitted snugly between and against the timbers or sills. The case or cylinder is provided with projecting tongues *c c*, each of which fits snugly in a groove in its respective adjacent side timber, and the case is further secured in position between and to the timbers by means of the bolts D. The front and back walls of the cylinder or case have in their parting-line circular orifices E, counterbored for the reception of correspondingly-formed sleeves or thimbles F F′, the cylinder or spring-case being constructed as shown to correspond to the diameter and length of the spring H, together with washers I I′. The spring H is inserted within the case between the washers I I′, and presses said washers snugly against the inner walls of the cylinder. The washers I I′ form a firm bearing for the spring H, and also, when at rest, operate to retain the sleeves F F′ in position within the counterbores, each washer also operating as a flange or extension of its adjacent sleeve, the flanged necks of said sleeves preventing the passage without or beyond their proper position within the circular orifices before mentioned, as clearly shown in Fig. 2.

After the case with its necessary appendages is in position and secured to the car, the rod G may be inserted in the draw-head K, said rod being securely retained therein by the head *g*, after which said rod may be passed through the case, sleeves, and washers, and the inclosed spring mechanism, as shown in Fig. 2, and secured therein by a key, K′. The draw-head is here shown resting upon the usual carry-iron, B, connected to the draft-timbers A A. The rear end of the draw-head is enlarged, preferably, to nearly the diameter of the spring H, the object of which is to form a good bearing-surface, so that there may be no danger of derangement or fracture of the spring-case M or its appendages.

It is plain that the spring or its adjacent attachments are not disturbed by the withdrawal of the rod G for the purpose of substituting a new head for a broken one or for other cause.

The spring-case may be withdrawn for repair or inspection by first removing the draw-bar and screw-bolts and then withdrawing the case vertically from its place between the draft-timbers. After liberation, as above, the two halves of the case may be separated, so as to fully expose the spring and other contents.

The mode in which my invention operates is as follows: When two cars provided with the said invention are brought together the draw-head K is driven back and the rear end, *z*, of the draw-head presses against the front end of sleeve F′. The latter in turn presses back the washer I′, and the latter presses against the spring H and compresses it against the washer I. If the collision between the cars is violent, the draw-head will continue to compress the spring until the end *z* of the draw-head impinges against the forward end of the spring-base, and then all further rearward movement of the sleeve F′, washer I′, and consequent further compression of the spring, is arrested, and any further portion of the shock is communicated to the case M, and through it to the car. In consequence of the nice adjustment of the sleeve, the end *z* of the draw-head impinges against the walls *y* before the different coils of the spring come in contact with each other. The spring is thus saved from being so compressed as to be crushed, strained, or otherwise injured. It is apparent that any longitudinal draft upon the draw-head will result in pressing the hindward sleeve against the spring, and when the spring has exhausted its resilient power, by a nice adjustment of the sleeve through the agency of the projection or key K′, the strain is, before the different coils of the spring come into contact with each other, communicated to the rear abutment or end, X, and the spring is saved from further compression and consequent injury. In the event of a violent collision between cars the burden of resistance is distributed between the rear wall, X, and the front wall, *y*, of the case, in consequence of the rear extremity, *z*, of the head colliding with the front wall, *y*, the spring pressing against the rear wall, X, and in the event of two cars coupled together being each violently pulled in a direction opposite to that in which the other is pulled, the burden of pulling strain is distributed between the front wall, *y*, and the rear wall, X, of the case, in consequence of the projection or key K′ striking against the rear wall, X, the spring pressing against the front wall, *y*. Hence in both of the above cases of operation the case with its spring mechanism is not liable to derangement and fracture. The spring is allowed to exert its full capacity to resist concussion, but is protected from being crushed or hammered together. It therefore retains for a much greater length of time its strength and elasticity, and adds to the life of the car.

In other car-coupling devices the spring is not protected, but, on the contrary, is subject to a continual thumping and hammering together of its parts, and is thereby in a short time made weak or rendered entirely useless, consequently subjecting the car to greater strain and concussion, and thereby shortening the latter's life and usefulness.

My invention, by protecting the spring from injury, and by the novel arrangement of its parts, prevents accumulation of lost motion, and obviates the binding, breaking, and rattling of followers, straps, and other parts, as is the case with most of the coupling appliances in common use.

What I claim as new and of my invention, and desire to secure by Letters Patent, is—

1. The spring H, arranged between the protecting-abutments X and *y*, in combination with the draw-head and its extension or rod G, the abutments being between the projections *z* and K of the draw-bar, and arranged to receive their impingement, and its rod G and devices for compressing the spring, through the agency of either of the said projections *z* and K, all for utilizing the full resilient resistance of the spring and protecting it from injury after its full resilient resistance has been brought into action.

2. The spring H, arranged between the projecting abutments X and *y*, in combination with the draw-head and its extension or rod G, the abutments being between the projections *z* and K of the draw-bar, and arranged to receive their impingement, and its rod G and thimbles and washers for compressing the spring, through the agency of either of the said projections *z* and K, all for utilizing the full resilient resistance of the spring and protecting it from injury after its full resilient resistance has been brought into action.

3. The combination of front abutment or wall, X, rear abutment or wall, *y*, secured to the car, draw-bar K, provided with rod G and projection *z*, spring H, sleeves F F′, with washers, the spring and washers being located between the said abutments, and the rod G being provided at rear of thimble F with the projection K′, the projections K and *z* being located, as shown, so closely to their respective abutments as to prevent the spring from being jammed or otherwise injured by the forward or backward movement or thrust of the draw-head and its rod G, substantially as and for the purposes set forth.

4. The combination of front wall, X, rear wall, *y*, secured to the car, draw-bar K, provided with rod G and projection *z*, spring H, and sleeves F F′, with flanges and washers, the walls X and *y* being counterbored to receive said flanges, the latter, together with the washers and spring, being located between the said walls, substantially as and for the purposes specified.

5. The coupling device consisting of the case C C′, having in its front and rear walls circular orifices, counterbored at *c*, sleeves or thimbles F F′, having flanged necks *f*, fitting into said counterbores *e* and operating against washers I I′ at each end of a spiral spring, H, draw-head K, carrying the rod G, upon which said sleeves and spring slide, and operating to press said sleeves, compress the spring, and at same time protecting the latter from injury, substantially as and for the purposes specified.

6. The case M, composed of two members, C C′, and provided with tongue *c* and end walls or abutments, X and *y*, having orifices receiving the sleeves F F′, substantially as and for the purposes specified.

GEO. BUTLER.

Witnesses:
A. S. LUDLOW,
E. R. HILL.